June 9, 1936.  C. W. McCOY  2,043,762

LIQUID CIRCULATING SYSTEM

Filed Jan. 2, 1935

INVENTOR
Charles W. McCoy
BY Edward E. Barnes
ATTORNEY

Patented June 9, 1936

2,043,762

UNITED STATES PATENT OFFICE 2,043,762

LIQUID CIRCULATING SYSTEM

Charles W. McCoy, Spokane, Wash.

Application January 2, 1935, Serial No. 71

10 Claims. (Cl. 103—76)

This invention relates to an improved system for circulating brine and particularly is directed to apparatus for use in a refrigeration system for preserving perishable freight in transit. More especially, the invention is directed to improvements in a syphonic system for this purpose and the objects of the invention are to increase the circulating efficiency whereby the temperature throughout the compartment containing the perishable freight is more effectively equalized than heretofore, to simplify the assembly in reducing the structural cost of the unit, and generally to eliminate weaknesses inherent in the syphonic systems as heretofore designed for vehicular traffic.

The invention consists in the novel construction, adaptation, and combination of parts hereinafter described and claimed.

In the drawing:—

Figure 1:
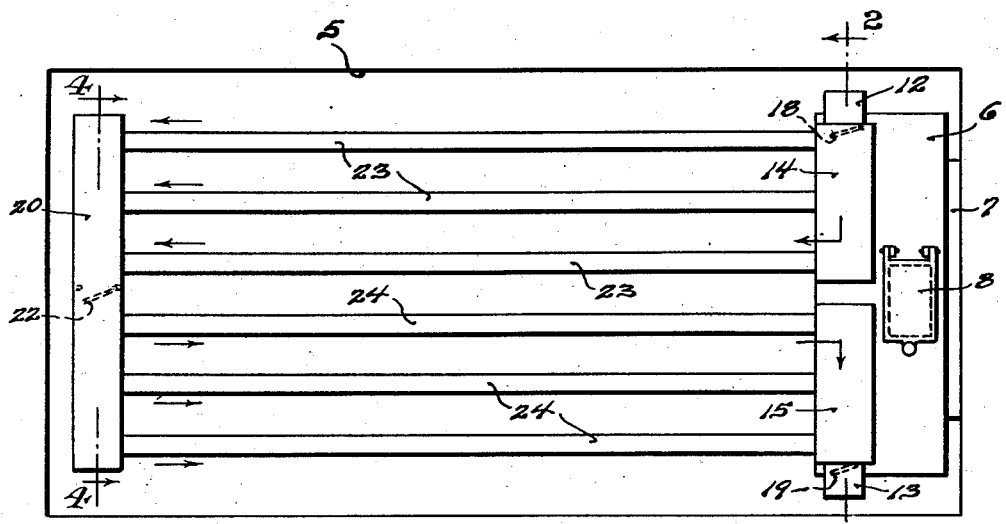
Figure 1 is a top plan view indicating, somewhat diagrammatically, the now preferred embodiment of the invention as the same is applied in the refrigeration of a compartment.
Figure 2:
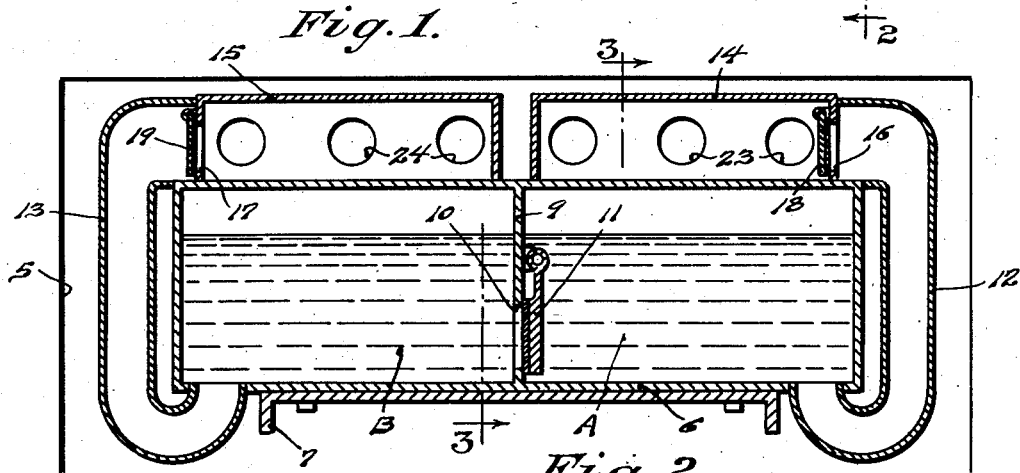
Fig. 2 is a transverse vertical section illustrating the main brine tank by means of which the brine is induced to circulate through the system, the view being taken to an enlarged scale on the line 2—2 of Fig. 1.
Figures 3, 4:
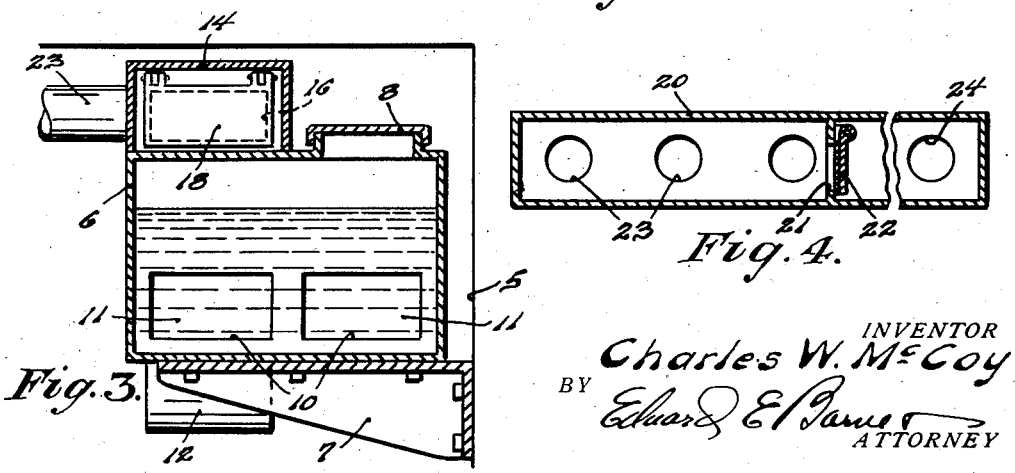

Fig. 3 is a longitudinal vertical fragmentary section on line 3—3 of Fig. 2; and Fig. 4 is a transverse vertical section, scale similar to that of Figs. 2 and 3, on the line 4—4 of Fig. 1.

Referring to the drawing, the numeral 5 indicates the inner wall surface of a refrigeration compartment. At one end of said compartment in proximity of the roof, a tank 6 is supported by means of a bracket 7 to locate the tank transversely of the car in obtaining a tilting action of the tank as the vehicle sways laterally under the influence of vehicle travel. Operating to receive a suitable brine such as a sodium chloride or calcium chloride solution, said tank is formed at its mid-length with a vertical partition 9 separating the tank into chambers A and B, the partition being formed with spaced openings 10 which, in the normal horizontal position of the tank or in response to a tilting of the tank in one direction, are closed by swing check valves 11.

In the syphonic systems now used on railway cars, automobile trucks, and other vehicles for the transit of perishable goods, the horizontal pipes running longitudinally of the refrigeration compartment immediately below the roof are designed to a substantial L shape in providing vertical legs at the tank end of the car which, at the lower ends, extend through the side wall of the tank below the level of the brine therein to communicate with the chambers A and B. A later development, the object being to form independent brine reservoirs below the tank floor for each of the pipes, comprised a plurality of sumps with the vertical leg elements of the pipes extending through the upper wall of the brine tank to extend below the tank floor into the sumps. A disadvantage of the sumps is that, due to the necessity of using individual sumps for each of the several pipes, the floor of the tank is weakened with the result that leaks are not infrequent at the point of juncture of the sump walls with the floor wall of the tank and the arrangement has a further disadvantage in that the extension of the pipe ends within the sumps reduces the capacity of the latter with the result that the relatively small reserve of brine which it is the object of the sumps to retain may be dislodged in response to vehicle jar occurring at such times as the tank lies at a major angle of inclination. The necessity, moreover, of forming the pipes to an L shape in either of the referred-to assemblies operates to produce sharp bends which increase the frictional retardation of the brine flow.

Particularly referring to the present invention, supported above the brine tank for each of the chambers A and B are brine receptacles or pockets 14 and 15 and at the opposite end of the compartment in the horizontal plane of the pockets is a chambered header 20, said header being divided at its midlength by a partition to form a pair of communicating brine cells. Communication between the cells is afforded through an opening 21 in the partition and, connecting the brine pocket 14 with one of the cells are a plurality of rectilineal pipes 23, the other cell connecting with the brine pocket 15 by means of a plurality of rectilineal pipes 24.

From the brine chamber A to the brine pocket 14, a pipe having a capacity in excess of that of the several pipes 23 is provided, and from the brine pocket 15 to the brine chamber B in completing the circuit is a similar pipe. Said pipes, indicated by 12 and 13, are connected to the ends of the respective brine pockets and communicate therewith through openings 16 and 17, extending along the end walls of the brine tank to terminate at the lower ends in U-shaped traps projecting below the tank to connect with the chambers A and B through the floor of the latter.

The capacity of brine flow through each of said openings 16 and 17 to and from the brine pockets 14 and 15, respectively, is equal to or in excess of the capacity of the several horizontal pipes which connect with the same, and provided therefor to promote the circulation of the brine through the system are swinging check valves 18 and 19 opening in the direction of brine flow. A similar check valve 22 is provided for the opening 21 between the brine cells of the header 20. While not shown in the drawing, I utilize rubber unions at each end of the pipes 23 and 24 for coupling the same to the pockets 14 and 15 and the header 20 in counter-acting vibrational stresses.

The operation of the described apparatus is believed clear. For the introduction of brine, an opening having a closure lid 8 therefor is provided in the tank 6. The system is filled with brine through a sublation of air from the brine pockets 14 and 15, pipes 23 and 24, and header 20, any suitable or desired means such as a suction pump, pressure pump, or as may be otherwise desired being used for this purpose. The introduction of brine is governed to afford an air space, as indicated, in the brine tank 6. As the valves 11 open under the influence of car sway, brine movement from chamber B to chamber A occurs, the brine level which obtains in chamber A being consequently higher than that of the chamber B as the valves 11 close under the influence of gravity with a resulting circulation of brine through pipe 12 to the brine pocket 14, from pocket 14 through pipes 23 to the connecting cell of the header 20, from the other communicating cell of the header through pipes 24 to the brine pocket 15, and from pocket 15 through pipe 13 to the chamber B. As the car stops or starts, the volumetric weight of the brine similarly induces circulation through the openings 16, 17, and 21 with the check valves opposing return flow. Any desired means such as that described in my co-pending application for Letters Patent of the United States, Ser. No. 759,678, filed December 29, 1934, may be used to cool the brine in withdrawing the heat which has been absorbed by the brine in its circulation through the system.

It is my intention that the scope of the invention be limited only by the expressed limitations of the hereto annexed claims.

What I claim, is:—

1. In a syphonic liquid-circulating system for vehicles, in combination with a tank for the liquid carried by the vehicle and divided by a partition to separate the tank into companion chambers, the partition being apertured and fitted with a check valve to allow circulation of the liquid in one direction only from one to the other chamber responsive to tilting movements of the vehicle, a pair of transversely extending liquid-receiving pockets at one end and a pair of transversely extending liquid-receiving cells at the opposite end of the vehicle, said cells and pockets being located above the level of the liquid in the tank, direct communication between the cells and indirect communication including the cells between the pockets, a liquid-conducting pipe between each of the pockets and a respective chamber, and means comprising a plurality of check valves in said system opening in the direction of liquid travel for promoting the circulation of the liquid through the system.

2. A syphonic liquid-circulating system for vehicles comprising, in combination with a tank for the liquid carried by the vehicle and divided by a partition to separate the tank into companion chambers, the partition being apertured and fitted with a check valve to allow circulation of the liquid in one direction only from one to the other chamber in response to tilting movements of the vehicle, a pair of pockets for the liquid at one end of the vehicle and a cell for the liquid at the opposite end of the vehicle, said pockets and cell being located above the level of the liquid in the tank, communication from one of said pockets to the cell and from the cell to the other pocket comprising a plurality of pipes extending between the pockets and the cell, a single pipe for delivering liquid from one of the chambers of the tank to one of the pockets, and a single pipe for returning liquid from the other pocket to the other chamber of the tank.

3. The system as described in claim 2, wherein each of said last-named pipes are formed with extensions projecting below the level of the tank floor to operate as traps in preventing the admission to the pockets of air present in the tank above the level of the liquid therein.

4. A syphonic liquid-circulating system comprising, in combination with two tanks having connection therebetween by means of which the liquid is passed from one to the other tank in a uniform direction, a pair of pockets of relatively large capacity located above the level of the liquid in the tanks and adapted to receive the liquid in its circulation through the system, an extended connection between said pockets having means therein for compelling the passage of the liquid from one to the other of the pockets in a uniform direction, a conduit for delivering liquid from one of the tanks to one of the pockets, and a conduit for delivering liquid from the other pocket to the other of the tanks.

5. A syphonic liquid-circulating system comprising, in combination with two tanks having connection therebetween, means for passing liquid in a uniform direction from one tank to the other tank, a pair of pockets for the liquid located above the level of the liquid in the tanks, a plurality of extended pipes connected at their inlet ends to one of the pockets and at their outlet ends to the other pocket to provide communication between the pockets, a conduit for delivering liquid from one of the tanks to one of the pockets, and a conduit for delivering liquid from the other pocket to the other tank.

6. A syphonic liquid-circulating system comprising, in combination with two connected tanks, and means for passing liquid in a uniform direction through said connection from one to the other tank, a pair of pockets for the liquid located above the level of the liquid in the tanks, a plurality of extended pipes between said pockets for connecting the same, and means between the tanks and the pockets for completing a circulatory system including the tanks, the pockets, and the pipes, said means comprising conduits connecting with the pockets at the upper ends of the same and formed with elbows at the lower ends adapted to underlie the tanks to communicate with the latter through the floor of the tanks, said elbows operating to trap the air present above the level of the liquid in the tanks against admission to the pockets.

7. The structure as defined in claim 6, said pockets and the pipes connecting the same being provided with means for compelling the passage of the liquid through the pockets and the pipes from one to the other tank in a uniform direction.

8. A syphonic liquid-circulating system comprising, in combination with two tanks connected for the passage of liquid from one to the other tank in a uniform direction, means located above the level of the liquid in the tanks and co-acting with the tanks to form a complete circulatory system containing the liquid, and means connecting said last named means with the tanks comprising vertical conduits formed at the lower ends with elbows adapted to extend under the tanks to communicate with the tank interiors through the floor of the tanks, said elbows operating to trap the air present above the level of the liquid in the tanks against admission to the upper level of the circulation system.

9. A syphonic liquid-circulating system for moving bodies adapted to effect circulation in response to body sway comprising, in combination with a pair of communicating tanks for the liquid carried by the body and having a check-valve between the same to allow circulation of the liquid in one direction only from one to the other tank, means located above the level of the liquid in the tanks having connection with the tanks and co-acting therewith to form a complete circulatory system containing the liquid, said connection between the tanks and said last-named means of the circulation system comprising conduits formed at the lower ends with elbows adapted to extend under the tanks to communicate with the tank interiors through the floor of the tanks, said elbows operating to trap the air present above the level of the liquid in the tanks against admission to the upper level of the circulation system.

10. A liquid-circulating system employing liquid-containing tanks and in which circulation is effected in response to syphonic levelling of the liquid within the tanks comprising, in combination with the tanks and means connecting the same to allow circulation of the liquid in one direction only from one to the other tank, means located above the level of the liquid in the tanks having connection with the tanks and co-acting therewith to form a complete circulatory system containing the liquid, said connection between the tanks and said last-named means of the circulation system comprising a single conduit for delivering liquid from one of the tanks to the admission end of the upper level of the circulation system, and a single conduit for returning liquid to the other tank from the delivery end of the upper level of the circulation system.

CHARLES W. McCOY.